(12) United States Patent
Onaka

(10) Patent No.: US 8,681,419 B2
(45) Date of Patent: Mar. 25, 2014

(54) OPTICAL AMPLIFIER AND TRANSMISSION LOSS MEASUREMENT METHOD

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 13/177,313

(22) Filed: Jul. 6, 2011

(65) Prior Publication Data

US 2012/0013975 A1    Jan. 19, 2012

(30) Foreign Application Priority Data

Jul. 16, 2010    (JP) ................................. 2010-161931

(51) Int. Cl.
- *H01S 3/30* (2006.01)
- *H04B 10/17* (2011.01)
- *H04B 10/12* (2011.01)

(52) U.S. Cl.
USPC ......................................................... 359/334

(58) Field of Classification Search
USPC ......................................................... 359/334
See application file for complete search history.

(56) References Cited

U.S. PATENT DOCUMENTS

| | | | |
|---|---|---|---|
| 6,433,922 B1 * | 8/2002 | Ghera et al. | 359/334 |
| 6,452,716 B1 * | 9/2002 | Park et al. | 359/334 |
| 6,519,082 B2 * | 2/2003 | Ghera et al. | 359/341.4 |
| 7,308,208 B2 | 12/2007 | Watanabe | |
| 7,554,721 B2 * | 6/2009 | Hiraizumi et al. | 359/344 |
| 2004/0090663 A1 | 5/2004 | Kamada et al. | |
| 2008/0123180 A1 | 5/2008 | Nakata | |
| 2009/0153951 A1 * | 6/2009 | Hiraizumi et al. | 359/334 |
| 2009/0190204 A1 * | 7/2009 | Onaka et al. | 359/334 |
| 2009/0195862 A1 * | 8/2009 | Kondoh et al. | 359/334 |
| 2009/0245786 A1 | 10/2009 | Sakamoto | |

FOREIGN PATENT DOCUMENTS

| | | |
|---|---|---|
| JP | 2004-159070 | 6/2004 |
| JP | 2004-172750 | 6/2004 |
| JP | 2005-277044 A | 10/2005 |
| JP | 2009-177587 | 8/2009 |
| JP | 2009-239813 A | 10/2009 |
| WO | WO 2006/137123 A1 | 12/2006 |

OTHER PUBLICATIONS

Japanese Office Action mailed Jan. 28, 2014 for corresponding Japanese Application No. 2010-161931, with partial English-language translation.

* cited by examiner

*Primary Examiner* — Eric Bolda

(74) *Attorney, Agent, or Firm* — Fujitsu Patent Center

(57) ABSTRACT

An optical amplifier that amplifies signal light with Raman amplification in the Raman amplification medium. The optical amplifier includes a light source that supplies pump light into the Raman amplification medium, a first detector that detects input power of the pump light to be input to the Raman amplification medium, a second detector that detects output power of the pump light output from the Raman amplification medium, and a processor operable to calculate transmission loss of the pump light in the Raman amplification medium by comparing the input power with the output power, and calculate transmission loss of the signal light in the Raman amplification medium based on the transmission loss of pump light corrected based on a wavelength of the signal light and a wavelength of the pump light.

9 Claims, 11 Drawing Sheets

OPTICAL AMPLIFIER AND TRANSMISSION LOSS MEASUREMENT METHOD

CROSS-REFERENCE TO RELATED APPLICATIONS

This application is based upon and claims the benefit of priority of the prior Japanese Patent Application No. 2010-161931, filed on Jul. 16, 2010, the entire contents of which are incorporated herein by reference.

FIELD

Embodiments relate to a technical field of an optical amplifier that is installed between nodes of an optical communication system and performs Raman amplification to amplify signal light. More particularly embodiments relate to a technical field of an optical amplifier and a method, which enable transmission loss of signal light between nodes to be measured.

BACKGROUND

With an increase in communication traffic in recent years, the demand for optical communication systems has increased. This type of an optical communication system includes a wavelength multiplexing optical amplifier (e.g., erbium doped fiber amplifier (EDFA)) for each of the transmission paths. The wavelength multiplexing optical amplifier amplifies signal light that propagates in the transmission path. A high-capacity optical amplification relay system that achieves long-distance transmission is a mainstream system.

In the optical amplification relay system, when transmission loss is large due to a long transmission path or the like, the power of signal light to be input to the EDFA is reduced. Thus, a transmission characteristic may be degraded due to a reduction in an S/N ratio that is the ratio of the power of the signal light to the power of noise light. To avoid the degradation of the transmission characteristic, Japanese Unexamined Patent Application Publications Nos. 2009-239813 and 2005-277044 each describe a distributed Raman amplification technique in which pump light is injected into the transmission path and an amplification effect is used with an effect of induced Raman scattering. The S/N ratio is increased by increasing the level of the signal light to be input to the optical amplifier. Thus, the transmission characteristic may be improved, and the number of spans available for transmission and a transmission distance may be increased.

In order to perform the Raman amplification and compensate for transmission loss in the transmission path, it is beneficial and/or necessary to accurately measure the transmission loss in the transmission path of the signal light. However, when the transmission path is long and causes the degradation of the S/N ratio or the like, the power of the signal light output from the transmission path may be difficult and/or impossible to appropriately measure. Therefore, there is a technical problem that the transmission loss may not be accurately measured. In this case, an amplification effect that uses Raman amplification and is necessary to enable the signal light to be reliably transmitted may not be determined, and the amplification may not be appropriately performed.

Japanese Unexamined Patent Application Publications Nos. 2009-239813 and 2005-277044 each describe a configuration in which monitoring light that is different from the signal light is supplied into the transmission path and the transmission loss is measured using the monitoring light. However, in order to achieve the configuration, it is necessary to prepare a high-power monitoring light source that supports the transmission loss caused by the long transmission path. Thus, a load is applied to a system that has the configuration. In addition, injection of the monitoring light into a power monitor located on the downstream side of the transmission path may cause a technical problem, or may reduce the accuracy of detecting the power of the signal light.

SUMMARY

According to an aspect of the disclosed embodiments, an optical amplifier that amplifies signal light with Raman amplification in the Raman amplification medium is described. The optical amplifier includes a light source that supplies pump light into the Raman amplification medium, a first detector that detects input power of the pump light to be input to the Raman amplification medium, a second detector that detects output power of the pump light output from the Raman amplification medium, and a processor operable to calculate transmission loss of the pump light in the Raman amplification medium by comparing the input power of the pump light with the output power of the pump light, and calculate transmission loss of the signal light in the Raman amplification medium based on the transmission loss of pump light corrected based on a wavelength of the signal light and a wavelength of the pump light.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

DESCRIPTION OF EMBODIMENT

Figure 1:
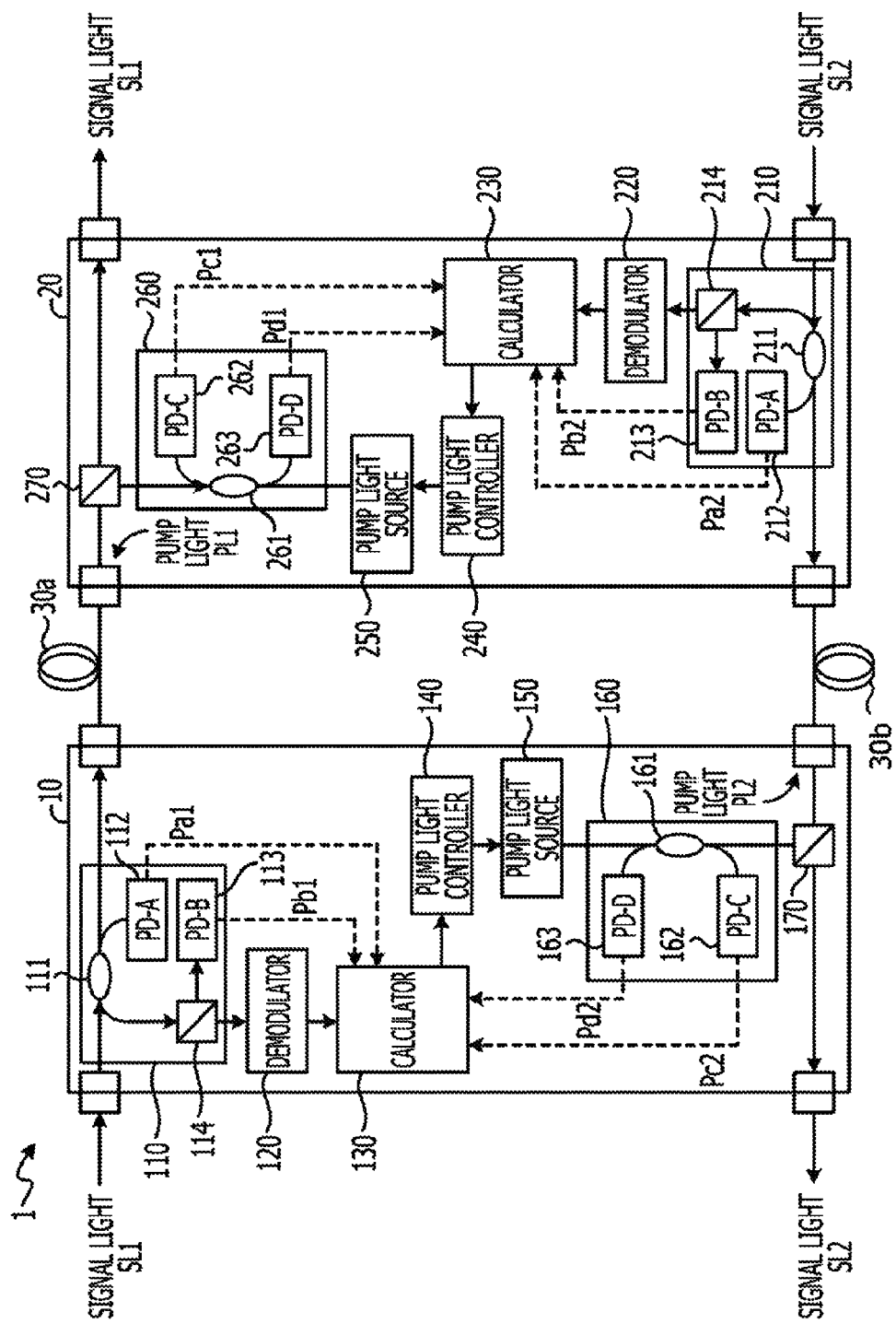
FIG. 1 is a diagram illustrating the configuration of a Raman amplifier that is included in an optical communication system.

The configuration of a Raman amplifier 1 that is an embodiment of an optical amplifier disclosed herein is described with reference to FIG. 1. FIG. 1 schematically illustrates the configuration of the Raman amplifier 1 that may be installed in an optical communication system that uses an optical fiber.

Referring to FIG. 1, the Raman amplifier 1 includes an optical device 10 and an optical device 20. The optical device 10 is connected, through optical connectors, to edges of optical transmission paths 30a and 30b that are provided between nodes. The optical device 20 is connected to the other edges of the optical transmission paths 30a and 30b through optical connectors.

As illustrated in FIG. 1, the Raman amplifier 1 performs distributed Raman amplification on signal light that propagates in both directions. Specifically, the Raman amplifier 1 performs the distributed Raman amplification on signal light SL1 that propagates from the side (left side of FIG. 1) of the optical device 10 through the optical transmission path 30a to the side (right side of FIG. 1) of the optical device 20. In addition, the Raman amplifier 1 performs the distributed Raman amplification on signal light SL2 that propagates from the side (right side of FIG. 1) of the optical device 20 through the optical transmission path 30b to the side (left side of FIG. 1) of the optical device 10.

The configurations of the optical devices are described below in detail.

The optical device 10 interoperates with the optical device 20 and thereby controls the distributed Raman amplification to be performed on the signal light SL1 propagating in the optical transmission path 30a and supplies pump light PL2 that is used to perform the distributed Raman amplification on the signal light SL2 that propagates in the transmission path 30b. The optical device 10 includes a light monitoring unit 110, a demodulator 120, a calculator 130, a pump light controller 140, a pump light source 150, a light monitoring unit 160 and a WDM coupler 170.

The light monitoring unit 110 monitors the power of light by causing a photodetector PD-A 112 or a photodetector PD-B 113 to receive the light output from a branching coupler 111 installed on the transmission path of the signal light SL1. The branching coupler 111 has four ports. The branching coupler 111 branches the light incident on the branching coupler 111 and outputs the light. Specifically, the signal light SL1 that is incident on the branching coupler 111 is output toward the optical transmission path 30a, while a part of the signal light SL1 is output to the photodetector PD-A 112. The photodetector PD-A 112 monitors the power of the received signal SL1 and outputs, to the calculator 130, data that indicates the power of the signal light SL1 as input power Pa1 of the signal light SL1. Pump light PL1 is incident on the branching coupler 111 from the side of the optical transmission path 30a and branched by an optical branching unit 114. The pump light PL1 is output to the demodulator 120, while a part of the pump light PL1 is output to the photodetector PD-B 113. The photodetector PD-B 113 monitors the power of the received pump light PL1 and outputs, to the calculator 130, data that indicates the power of the pump light PL1 as output power Pb1 of the pump light PL1.

The demodulator 120 demodulates the received pump light PL1 subjected to modulation and thereby acquires modulation data to be superimposed on the pump light PL1. Then, the demodulator 120 outputs the acquired modulation data to the calculator 130. The modulation data is data that indicates the state of the pump light PL1, while the state of the pump light PL1 to be input to the optical transmission path 30a is set by the optical device 20, as described later. For example, the modulation data indicates input power Pc1 of the pump light PL1 to be monitored by a photodetector PD-C 262 included in the optical device 20.

The calculator 130 includes a data storage unit (such as a memory, for example) and a calculating unit (such as a central processing unit (CPU), for example). The thus-configured calculator 130 receives the data that indicates the output power Pb1 of the pump light PL1 and has been received by the photodetector PD-B 113. In addition, the calculator 130 receives the data that indicates the input power Pc1 of the pump light PL1 and is included in the modulation data acquired by the demodulator 120. Then, the calculator 130 calculates span loss of the pump light PL1 in the optical transmission path 30a.

The pump light controller 140 is a device that controls the state of the pump light PL2 to be output by the pump light source 150. For example, the pump light controller 140 controls the amount of the pump light PL2 by controlling a driving current to be supplied to the pump light source 150. In addition, the pump light controller 140 performs modulation control on the driving current to be supplied to the pump light source 150 so that information that indicates the state (such as input power Pct of the pump light PL2 to be input from a photodetector PD-C 162) of the pump light PL2 to be input is superimposed on the pump light PL2.

The pump light source 150 is a light source that supplies, into the optical transmission path 30b, the pump light PL2 that is used to perform counter-pumped distributed Raman amplification on the signal light SL2 that propagates in the optical transmission path 30b. The pump light PL2 is output from the pump light source 150 to the optical transmission path 30b through the light monitoring unit 160 and the WDM coupler 170.

The light monitoring unit 160 monitors the power of light by causing the photodetector PD-C 162 or a photodetector PD-D 163 to receive the light output from a branching coupler 161 provided on a transmission path of the pump light PL2. The branching coupler 161 has four ports. The branching coupler 161 branches the light incident on the branching coupler 161 and outputs the light. Specifically, the pump light PL2 that is incident on the branching coupler 161 from the pump light source 150 is output toward the optical transmission path 30b, while a part of the pump light SL2 is output to the photodetector PD-C 162. The photodetector PD-C 162 monitors the power of the received pump light PL2 and outputs, to the calculator 130, data that indicates the power of the pump light PL2 to be input to the optical transmission path 30b as input power Pct of the pump light PL2. In addition, the pump light PL2 that is reflected from the side of the optical transmission path 30b is incident on the branching coupler 161 and output to the photodetector PD-D 163. The photodetector PD-D 163 monitors the power of the reflected received pump light PL2 and outputs, to the calculator 130, data that indicates the power of the pump light PL2 reflected from the optical transmission path 30b as reflection power Pd2 of the pump light PL2.

The WDM coupler 170 outputs, to the downstream side (left side of FIG. 1), the signal light SL2 that has been output from the optical device 20 and has passed through the optical transmission path 30b. The WDM coupler 170 outputs, to the optical transmission path 30b, the pump light PL2 output from the pump light source 150. In addition, the WDM coupler 170 outputs, to the light monitoring unit 160, the pump light PL2 reflected from the optical transmission path 30b or from the side of the optical device 20.

The optical device 20 interoperates with the optical device 10 and thereby controls the distributed Raman amplification to be performed on the signal light SL2 propagating in the optical transmission path 30b and supplies the pump light PL1 that is used to perform the distributed Raman amplification on the signal light SL1 that propagates in the transmission path 30a. The optical device 20 includes a light monitoring unit 210, a demodulator 220, a calculator 230, a pump light controller 240, a pump light source 250, a light monitoring unit 260 and a WDM coupler 270.

The light monitoring unit 210 monitors the power of light by causing a photodetector PD-A 212 or a photodetector PD-B 213 to receive the light output from a branching coupler 211 installed on the transmission path of the signal light SL2. The branching coupler 211 has four ports. The branching coupler 211 branches the light incident on the branching coupler 211 and outputs the light. Specifically, the signal light SL2 that is incident on the branching coupler 211 is output toward the optical transmission path 30b, while a part of the signal light SL2 is output to the photodetector PD-A 212. The photodetector PD-A 212 monitors the power of the received signal light SL2 and outputs, to the calculator 230, data that indicates the power of the signal light SL2 as input power Pa2 of the signal light SL2. In addition, the pump light PL2 that is incident on the branching coupler 211 from the side of the optical transmission path 30b is branched by a light branching unit 214. Then, the pump light PL2 is output to the demodulator 220, while a part of the pump light PL2 is output to the photodetector PD-B 213. The photodetector PD-B 213 monitors the power of the received pump light PL2 and outputs, to the calculator 230, data that indicates the power of the pump light PL2 as output power Pb2 of the pump light PL2.

The demodulator 220 demodulates the received pump light PL2 subjected to the modulation and thereby acquires modulation data to be superimposed on the pump light PL2. Then, the demodulator 220 outputs the acquired modulation data to the calculator 230. The modulation data is data that indicates the state of the pump light PL2 while the state of the pump light PL2 to be input to the optical transmission path 30b is set by the optical device 10, as described later. For example, the modulation data indicates the input power Pc2 of the pump light PL2 to be monitored by the photodetector PD-C 162 included in the optical device 10.

The calculator 230 includes a data storage unit (such as a memory, for example) and a calculating unit (such as a CPU, for example). The thus-configured calculator 230 receives the data that indicates the output power Pb2 of the pump light PL2 and has been received by the photodetector PD-B 213. In addition, the calculator 230 receives the data that indicates the input power Pc2 of the pump light PL2 and is included in the modulation data acquired by the demodulator 220. The calculator 230 calculates span loss of the pump light PL2 in the optical transmission path 30b.

The pump light controller 240 is a device that controls the state of the pump light PL1 to be output from the pump light source 250. For example, the pump light controller 240 controls the amount of the pump light PL1 by controlling a driving current to be supplied to the pump light source 250. In addition, the pump light controller 240 performs modulation control on the driving current to be supplied to the pump light source 250 so that information that indicates the state (such as the input power Pc1 of the pump light PL1 to be input from the photodetector PD-C 262 for example) of the pump light PL1 to be input is superimposed on the pump light PL1.

The pump light source 250 is a light source that supplies, into the optical transmission path 30a, the pump light PL1 that is used to perform counter-pumped distributed Raman amplification on the signal light SL1 that propagates in the optical transmission path 30a. The pump light PL1 is output from the pump light source 250 to the optical transmission path 30a through the light monitoring unit 260 and the WDM coupler 270.

The light monitoring unit 260 monitors the power of light by causing the photodetector PD-C 262 or a photodetector PD-D 263 to receive the light output from the branching coupler 261 installed on an optical transmission path of the pump light PL1. The branching coupler 261 has four ports. The branching coupler 261 branches the light incident on the branching coupler 261 and outputs the light. Specifically, the pump light PL1 that is incident on the branching coupler 261 from the pump light source 250 is output toward the optical transmission path 30a, while a part of the pump light PL1 is output to the photodetector PD-C 262. The photodetector PD-C 262 monitors the power of the received pump light PL1 and outputs, to the calculator 230, data that indicates the power of the pump light PL1 to be input to the optical transmission path 30a as the input power Pc1 of the pump light PL1. In addition, the pump light PL1 that is reflected from the side of the optical transmission path 30a and incident on the branching coupler 261 is output to the photodetector PD-D 263. The photodetector PD-D 263 monitors the power of the received pump light PL1 and outputs, to the calculator 230, data that indicates the power of the pump light PL1 reflected from the optical transmission path 30a as reflection power Pd1 of the pump light PL1.

The WDM coupler 270 outputs, to the downstream side (right side of FIG. 1), the signal light SL1 output from the optical transmission path 30a or from the side of the optical device 10, and outputs, toward the optical transmission path 30a, the pump light PL1 output from the pump light source 250. In addition, the WDM coupler 270 outputs, to the light monitoring unit 260, the pump light PL1 reflected from the optical transmission path 30a or from the side of the optical device 10.

The optical transmission path 30a causes the signal light SL1 incident on the optical transmission path 30a from the optical device 10 to propagate and be incident on the optical device 20. In addition, the optical transmission path 30a causes the pump light PL1 incident on the optical transmission path 30a from the optical device 20 to propagate and be incident on the optical device 10. The signal light SL1 that propagates in the optical transmission path 30a is subjected to the Raman amplification using the pump light PL1.

The optical transmission path 30b causes the signal light SL2 incident on the optical transmission path 30b from the optical device 20 to propagate and be incident on the optical device 10. The optical transmission path 30b causes the pump light PL2 incident on the optical transmission path 30b from the optical device 10 to propagate and be incident on the optical device 20. The signal light SL2 that propagates in the optical transmission path 30b is subjected to the Raman amplification using the pump light PL2.

An effect of the Raman amplification that is performed by each of the optical devices 10 and 20 is described with reference to FIG. 2. For convenience, the following description focuses on a configuration that causes the signal light SL1 to propagate. Unless otherwise indicated herein, a configuration that causes the signal light SL2 to propagate may be the same as the configuration that causes the signal light SL1 to propagate.

Figure 2:
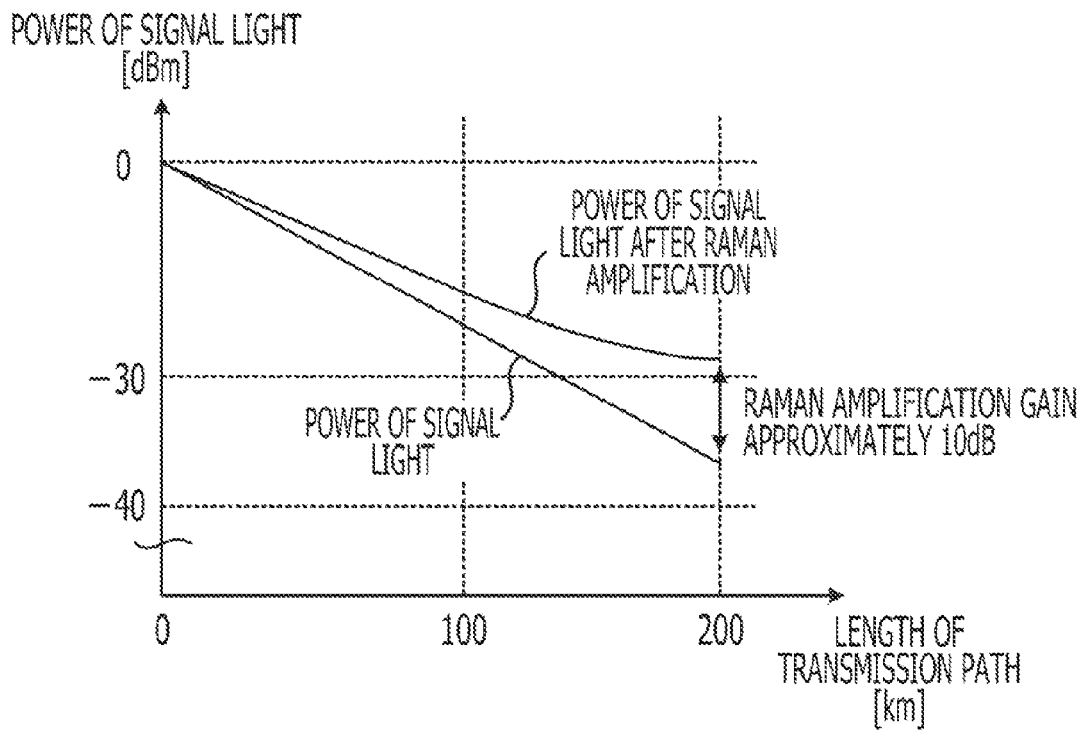
FIG. 2 is a graph illustrating the relationship between the length of a transmission path provided between nodes included in the optical communication system and power of signal light.

FIG. 2 is a graph illustrating the length of the optical transmission path 30a, the power of the signal light that propagates in the optical transmission path 30a, and the effect of the Raman amplification. As illustrated in FIG. 2 as a distance that the signal light SL1 propagates in the optical transmission path 30a is increased, the power of the signal light SL1 is reduced due to span loss. There is a demand for the optical transmission path 30a to have a relatively large length on the basis of characteristics and/or requirements for installation of the nodes in some cases. An optical property such as the S/N ratio of the signal light SL1 to noise may be largely degraded depending on the length of the optical transmission path. Thus, in the Raman amplifier 1, the pump light PL1 is injected into the optical transmission path 30a so that the distributed Raman amplification is performed to amplify the power of the signal light SL1.

In order to perform the Raman amplification so as to appropriately amplify the power of the signal light SL1, it is preferable to monitor loss (caused by the span loss in the optical transmission path 30a) of the power of the signal light SL1. For example, the optical device 20 may amplify the power of the signal light SL1 in an appropriate manner by determining a gain to be obtained by the Raman amplification on the basis of the loss of the power of the signal light SL1. Thus, it is preferable to accurately calculate the span loss. However, when the optical loss that is caused by the span loss and occurs in the optical transmission path 30a is large, the power of the signal light SL1 is reduced and may be affected by dark currents of the photodetectors PD included in the optical device 20 or the like. As a result, the span loss may not be accurately measured in some cases.

As described above, in the Raman amplifier 1 disclosed herein, the span loss of the signal light SL1 in the optical transmission path 30a may be calculated by correcting the span loss that occurs in the optical transmission path 30a and is measured using the pump light PL1.

Figure 3:
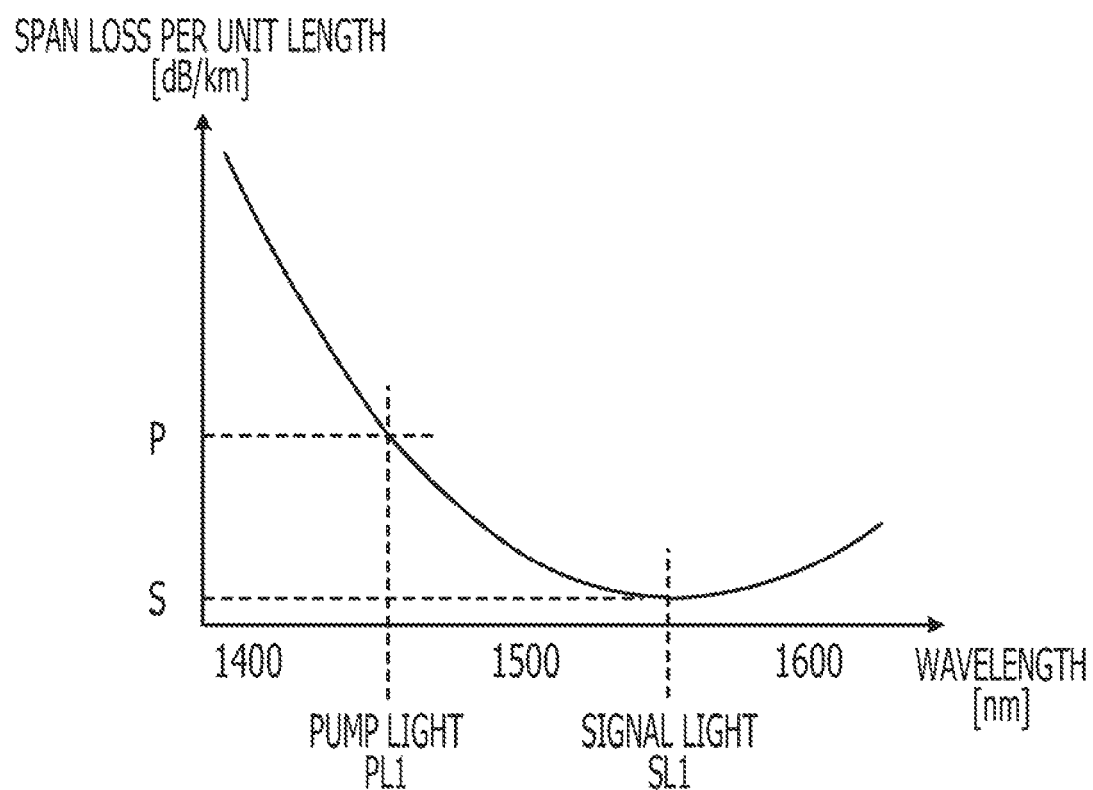
FIG. 3 is a graph illustrating the relationship between a wavelength of light propagating in the transmission path and transmission loss of the light.

FIG. 3 illustrates the relationship between the wavelength of the light propagating in the optical transmission path and span loss per unit length of the optical transmission path. The optical transmission path has a loss wavelength characteristic indicating that optical loss that is caused by the span loss per unit length of the optical transmission path and varies depending on the wavelength of the light propagating in the optical transmission path. For example, as illustrated in FIG. 3, since a wavelength band of the pump light PL1 is different from a wavelength band of the signal light SL1, optical loss of the pump light PL1, which is caused by span loss per unit length of the optical transmission path, is different from optical loss of the signal light SL1, which is caused by span loss per unit length of the optical transmission path.

When the optical transmission path includes the same dopant material, the optical transmission path has a constant loss wavelength characteristic. In order to uniformly maintain a desired wavelength distribution characteristic of the optical transmission path, a refraction index needs to be uniform in the optical transmission path. Thus, it is preferable that the optical transmission path be manufactured so that the refraction index be uniform in the optical transmission path. Specifically, it is preferable that the optical transmission path be manufactured so that the proportion (that may be one of the causes of span loss and is a wavelength characteristic) of a dopant to a glass material of the optical transmission path is uniform in the optical transmission path. Generally, the optical transmission path is processed at a high temperature in the manufacturing process, and the dopant material is uniformly diffused in the optical transmission path by the process. On these grounds, the optical transmission path may be regarded as having the aforementioned characteristic.

When span loss per unit length for the wavelength band of the pump light PL1 is indicated by "P" and span loss per unit length for the wavelength band of the signal light SL1 is indicated by "S", the ratio (ratio S/P) of the span loss "S" to the span loss "P" may be regarded as being constant. Thus, when span loss for the wavelength band of the pump light PL1 is indicated by Lp1 and span loss for the wavelength band of the signal light SL1 is indicated by Ls1, the span loss Ls1 may be calculated by applying the ratio S/P as a correction value to the span loss Lp1.

Figure 4:
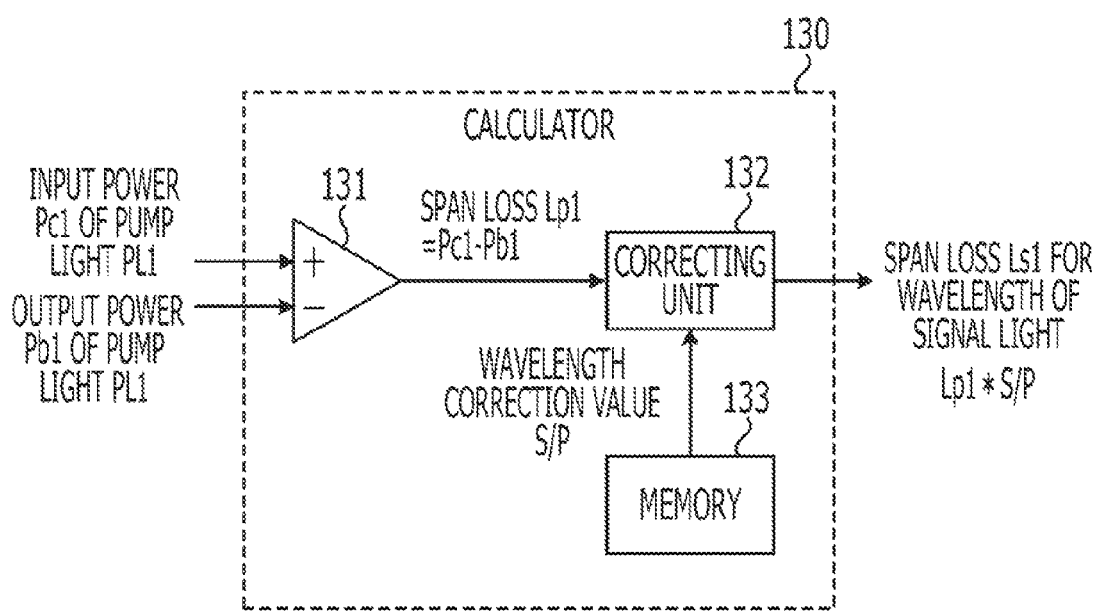
FIG. 4 is a block diagram illustrating a function unit that forms a calculator that is included in the Raman amplifier.

FIG. 4 is a block diagram illustrating the configuration of a function unit that calculates the span loss Ls1 for the wavelength band of the signal light SL1 and is included in the calculator 130 of the optical device 10. The calculator 130 has an adder 131 and a correcting unit 132.

The adder 131 calculates the span loss Lp1 (=Pc1−Pb1) for the wavelength band of the pump light PL1 from the difference between the input power Pc1 (of the pump light PL1) acquired by the demodulator 120 of the optical device 10 and the output power Pb1 (of the pump light PL1) received from the photodetector PD-B 113 of the optical device 10.

The correcting unit 132 calculates the span loss Ls1 (=Lp1×S/P) for the wavelength band of the signal light SL1 by multiplying the span loss Lp1 for the wavelength band of the pump light PL1 by the ratio S/P determined on the basis of the dopant material and the like of the optical transmission path 30a. In order to calculate the span loss Ls1, the correcting unit 132 acquires the correction coefficient S/P on the basis of the loss wavelength characteristic of the optical transmission path 30a by referencing data stored in a memory 133 or the like.

Operations of the Raman amplifier 1, which are related to the calculation of the span loss Ls1 for the wavelength band of the signal light SL1 in the optical transmission path 30a, are described below in detail.

Figure 5:
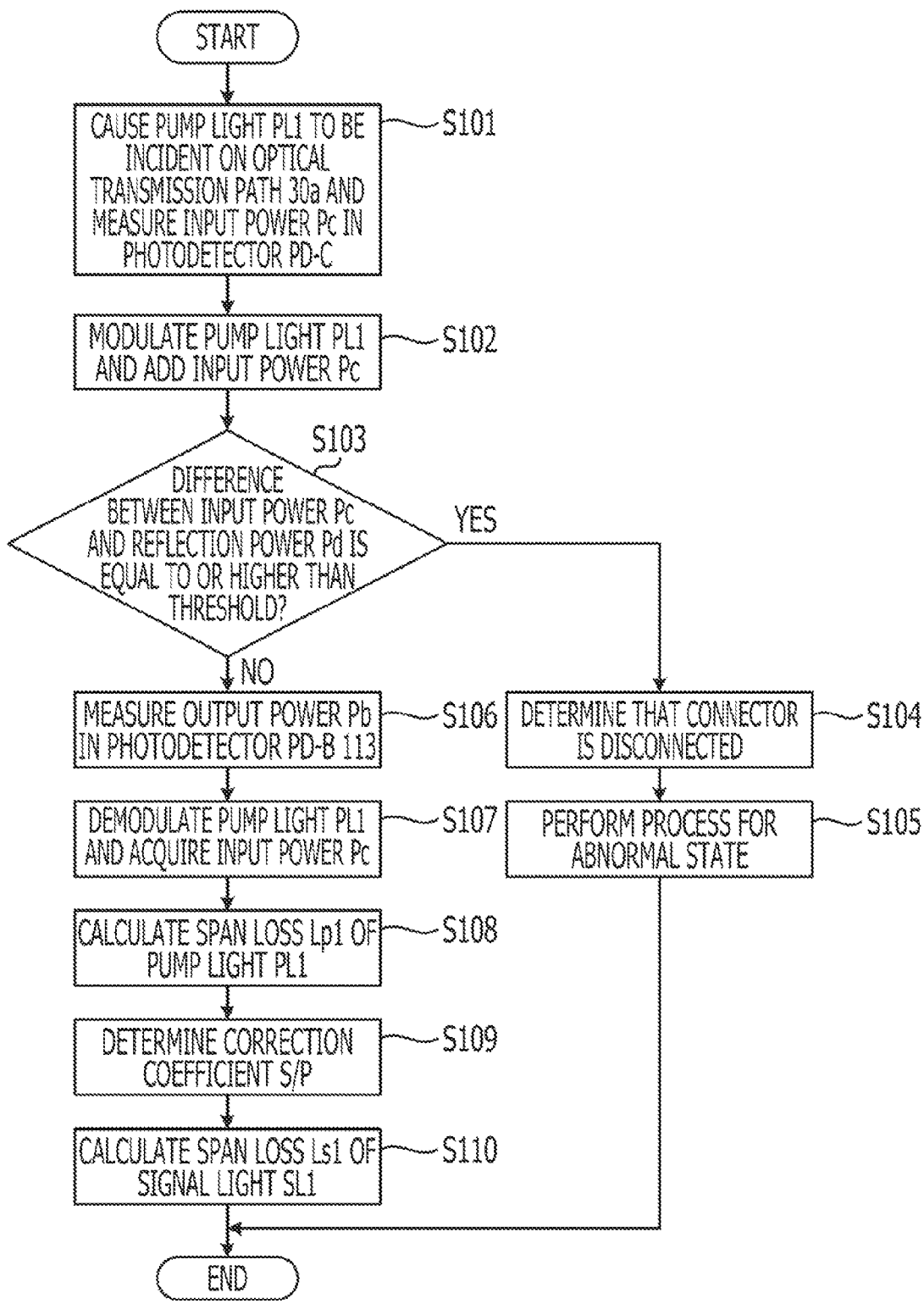
FIG. 5 is a flowchart of an operation of calculating span loss of the signal light for a wavelength of the signal light on the basis of measured span loss of pump light.

An example of an operation of calculating the span loss of the signal light SL1 in the optical transmission path 30a is described below. This calculation operation is performed by the Raman amplifier 1. FIG. 5 is a flowchart of the operation of calculating the span loss, while the operation is performed by the Raman amplifier 1. The occurrence of a non-signal state that is caused by a disconnection of a connector in the optical transmission path 30a or the like may be detected by the calculation operation, as described later.

In the operation of calculating the span loss, the pump light source 250 first outputs the pump light PL1 to the optical transmission path 30a under control of the pump light controller 240 of the optical device 20. A part of the pump light PL1 is output to the photodetector PD-C 262 by the branching coupler 261, and the photodetector PD-C 262 measures the input power Pc1 (in operation S101). The pump light PL1 that is reflected by the optical transmission path 30a is output to the photodetector PD-D 263 by the branching coupler 261, and the photodetector PD-D 263 measures the reflection power Pd1.

The pump light controller 240 of the optical device 20 modulates the driving current to be applied to the pump light source 250 so that the information that indicates the input power Pc1 of the pump light PL1 to be input to the photodetector PD-C 262 is superimposed on the pump light PL1 (in operation S102).

The calculator 230 of the optical device 20 compares the input power Pc1 of the pump light PL1 input to the photodetector PD-C 262 with the reflection power Pd1 of the pump light PL1 input to the photodetector PD-D 263 (in operation S103). A threshold is set to a value that is smaller than the reflection power Pd1 of the pump light PL1 normally reflected in the optical transmission path 30a so that the reflection power of the pump light PL1 reflected by an air layer in the optical transmission path 30a due to a disconnection of a connector or the like may be detected. Specifically, when the difference between the input power Pc1 of the pump light PL1 and the reflection power Pd1 of the pump light PL1 is equal to or higher than the threshold, the photodetector PD-D 263 monitors the reflection power Pd1 of the pump light PL1 reflected by the air layer.

When the difference between the input power Pc1 of the pump light PL1 and the reflection power Pd1 of the pump light PL1 is equal to or higher than the threshold (Yes in operation S103), the calculator 230 notifies the pump light controller 240 that the difference between the input power Pc1 of the pump light PL1 and the reflection power Pd1 of the pump light PL1 is equal to or higher than the threshold. The pump light controller 240 receives the notification and thereby determines that the non-signal state occurs in the optical transmission path 30a owing to a disconnection of a connector or the like (in operation S104). The pump light controller 240 performs a process for the abnormal state, for example, causes the pump light source 250 to stop outputting the pump light PL1 or provides an alarm (in operation S105), and terminates the operation.

On the other hand, when the difference between the input power Pc1 of the pump light PL1 and the reflection power Pd1 of the pump light PL1 is lower than the threshold (No in operation S103), a disconnection of a connector and the like is determined to not have occurred and the pump light PL1 passes through the optical transmission path 30a and is incident on the optical device 10. A part of the pump light PL1 is output to the photodetector PD-B 113 by the branching coupler 111 so that the output power Pb1 is measured by the photodetector PD-B 113 (in operation S106). In addition, the other part of the pump light PL1 is received by the demodulator 120. The demodulator 120 demodulates the received pump light PL1 subjected to the modulation by the pump light controller 240 of the optical device 20 and thereby acquires the input power Pc1 (in operation S107).

The calculator 130 calculates the span loss Lp1 in the optical transmission path 30a for the wavelength band of the pump light PL1 from the difference between the input power Pc1 (of the pump light PL1) acquired by the demodulator 120 and the output power Pb1 (of the pump light PL1) measured by the photodetector PD-B 113 (in operation S108).

Next, the calculator 130 references a database or the like of an inner memory or the like and determines the correction coefficient S/P on the basis of the optical transmission path 30a (in operation S109). The calculator 130 calculates the span loss Ls1 for the wavelength band of the signal SL1 by applying the determined correction coefficient S/P to the span loss Lp1 in the optical transmission path 30a for the wavelength band of the pump light PL1 (in operation S110).

In the aforementioned series of operations, the span loss Ls1 in the optical transmission path 30a for the wavelength band of the signal light SL1 is calculated. Even if the optical transmission path 30a is long and the span loss is large on the output side of the optical transmission path 30a so that the signal light SL1 that is not subjected to the amplification using the pump light may not be confirmed, the span loss Ls1 for the wavelength band of the signal light SL1 may be calculated.

The power of the pump light PL1 is generally significantly higher than the power of the signal light SL1. Thus, even if the optical transmission path 30a is long and causes the span loss to be large, the span loss Lp1 may be measured. As illustrated in FIG. 3, the span loss for the wavelength band of the pump light per unit length of the optical transmission path 30a is larger than the span loss for the wavelength band of the signal light per unit length of the optical transmission path 30a, and the power of the pump light is much higher than the power of the signal light. Thus, a large range of the span loss Ls1 for the wavelength band of the signal light SL1 may be calculated.

In recent years, there is a demand for the length of an optical transmission path of an optical transmission system to increase. Thus, the length of the optical transmission path 30a tends to increase, and the span loss Ls1 tends to be large. When the optical amplifier 1 is used, the span loss Ls1 that tends to be large may be calculated with high accuracy. Thus, the optical amplifier 1 is effective from the perspective of the increase in the length of the optical transmission path 30a. Since the optical transmission path 30a is capable of having a long length, intervals between relays of the optical communication system may be set to large values so that the number of relay stations is reduced. Thus, there is an advantage that the cost of building and maintaining the entire system is reduced owing to the reduction in the number of the relay stations. Even when a relay station may not be installed in a long space, the optical transmission path 30a is capable of having a long length and whereby the optical communication system may be installed. Thus, the Raman amplifier 1 is effective.

The Raman amplifier 1 achieves the counter-pumped distributed Raman amplification by supplying the pump light PL1 from the optical device 20 into the optical transmission path 30a. Thus, there is no Raman gain or there is an extremely small Raman gain on the side on which the signal light SL1 is input to the optical transmission path 30a. Thus, it is possible to appropriately suppress inputting of noise light generated in the optical transmission path 30a to the photodetector PD-B 113 (for measuring the output power Pb1 of the pump light PL1), the photodetector PD-C 262 (for measuring the input power Pc1 of the pump light PL1) and the like. Thus, an effect of the noise light on the values measured by the photodetectors for measurement of the span loss may be substantially reduced and/or eliminated, and the measurement of the span loss may be performed with high accuracy.

The wavelength of the pump light PL1 is fixed by the pump light controller 140 on the basis of the wavelength of the signal light SL1 in order to suppress the fact that a gain obtained by the amplification varies depending on the wavelength. Thus, it is possible to suppress a variation in the wavelength of the signal light SL1 with respect to the correction coefficient S/P and a variation in the wavelength of the pump light PL1 with respect to the correction coefficient S/P. The correction using the correction coefficient S/P may be accurately performed.

When the span loss Ls1 (calculated with high accuracy) for the wavelength band of the signal light SL1 is used for appropriate control or appropriate transmission of information, performance of transmission of the signal light SL1 may be improved.

A modified example of the optical amplifier 1 is described with reference to FIGS. 6 and 7. The optical amplifier 1 according to the modified example performs an operation of calculating the correction coefficient on the basis of a variation in the loss wavelength characteristic indicating the span loss in the optical transmission path.

The loss wavelength characteristic indicates the span loss (per unit length of the optical transmission path) that varies depending on the wavelength of the light that propagates in the optical transmission path. The loss wavelength characteristic varies depending on a wavelength dispersion of the light in the optical transmission path. Thus, the wavelength dispersion of the light in the optical transmission path is adjusted by changing at least one of the refraction index of the optical transmission path and the diameter of a core of the optical transmission path. The loss wavelength characteristic may be set to a desired value by the adjustment of the wavelength dispersion of the light in the optical transmission path. The refraction index of the optical transmission path varies depending on the dopant material contained in the core and cladding of the optical transmission path. In addition, various types of optical transmission paths such as a single-mode optical fiber and a multi-mode optical fiber may be used for various usage purposes on the basis of the diameters of cores of the optical transmission paths, for example. Next, optical transmission paths that have different refraction indexes and cores formed in different shapes and thus have different loss wavelength characteristics are described as optical transmission paths of different types.

Figure 6:
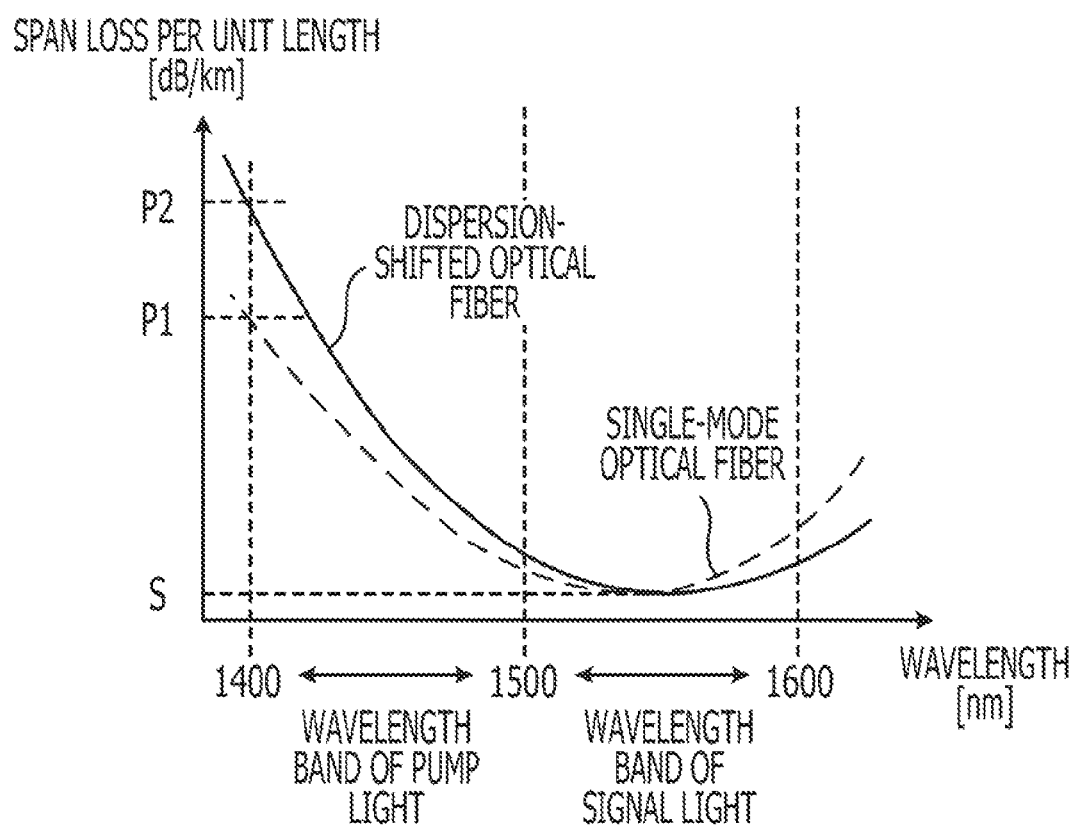
FIG. 6 is a graph illustrating the relationship between a wavelength of light and transmission loss of the light for each of the types of transmission paths.
Figure 7:
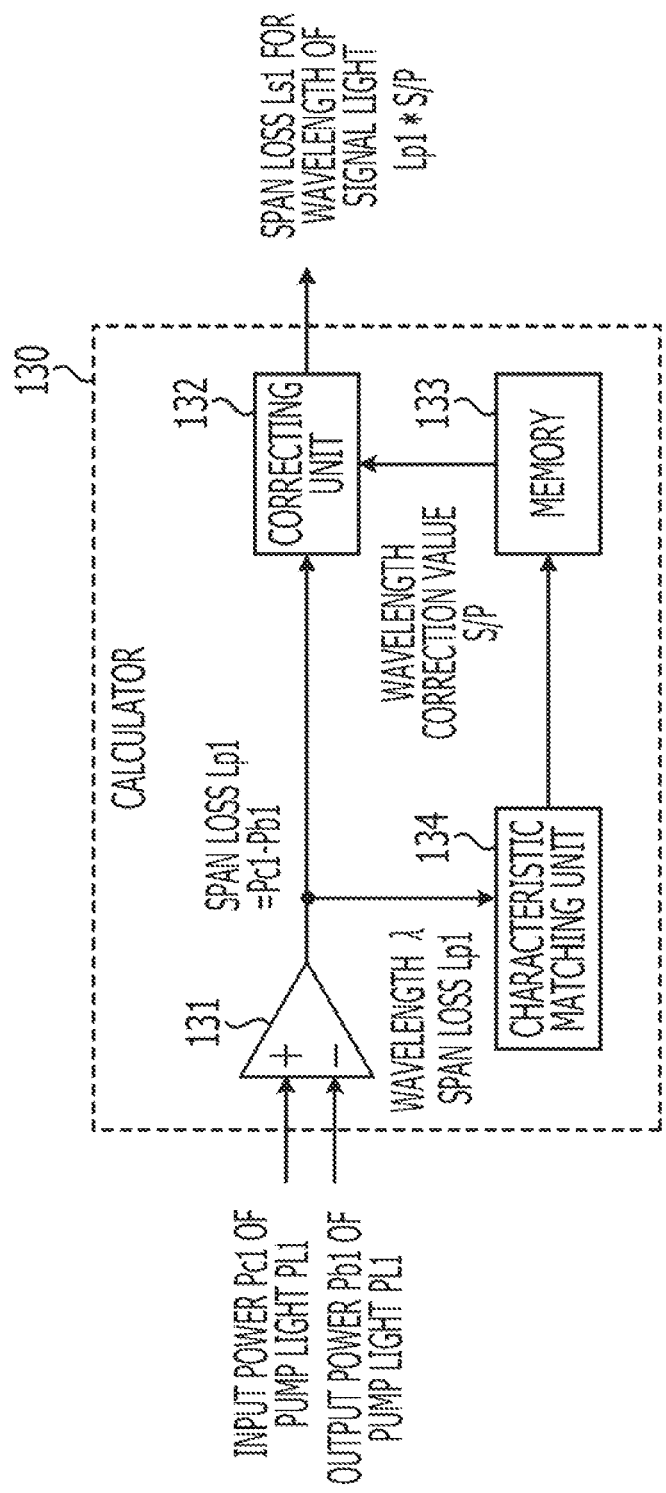
FIG. 7 is a block diagram illustrating the configuration of a function unit that is included in a calculator included in an optical amplifier according to a modified example and calculates span loss of the signal light for a wavelength band of the signal light.

FIG. 6 is a graph illustrating an example of the difference between the loss wavelength characteristics of the optical transmission paths of the different types. FIG. 6 illustrates a loss wavelength characteristic of a single-mode optical fiber (indicated by a dotted line) and a loss wavelength characteristic of a dispersion-shifted optical fiber (indicated by a solid line). As illustrated in FIG. 6, span loss of light for the wavelength of the light propagating in the single-mode optical fiber per unit length of the single-mode optical fiber is different from span loss of the light for the wavelength of the light propagating in the dispersion-shifted optical fiber per unit length of the dispersion-shifted optical fiber. Specifically, span loss of the pump light for the wavelength band (generally known as a wavelength band ranging from 1400 nm to a slightly higher value than 1500 nm) of the pump light per unit length of the dispersion-shifted optical fiber is larger than span loss of the pump light for the wavelength band of the pump light per unit length of the single-mode optical fiber. On the other hand, span loss of the signal light for the wavelength band (generally known as a wavelength band ranging from a slightly higher value than 1500 nm) of the signal light per unit length of the single-mode optical fiber is larger than span loss of the signal light for the wavelength band of the signal light per unit length of the dispersion-shifted optical fiber.

When the span loss of the pump light per unit length of the single-mode optical fiber is indicated by P1, and the span loss of the pump light per unit length of the dispersion-shifted optical fiber is indicated by P2 the span loss P2 is larger than the span loss P1. Thus, when the aforementioned correction coefficient S/P is simply applied to the optical transmission paths that have the different loss wavelength characteristics, it is difficult to accurately calculate the span loss of the signal light for the wavelength of the signal light.

The optical amplifier 1 according to the modified example performs a process of changing the correction coefficient (to be applied) on the basis of the type of each of the optical transmission paths of the different types. FIG. 7 is a block diagram illustrating a function unit that is included in the calculator 130 included in the optical amplifier 1 according to the modified example and calculates the span loss Ls1 for the wavelength band of the signal light SL1. The function unit may by provided instead of the function unit illustrated in FIG. 4 and included in the calculator 130, for example.

The function unit has the configuration illustrated in the FIG. 4 and further includes a characteristic matching unit 134. In addition, the memory 133 according to the modified example has therein a database storing a plurality of loss wavelength characteristics that are based on the types of the optical transmission paths 30a. The characteristic matching unit 134 receives data that indicates the wavelength λ of the pump light PL1 input to the calculator 130. In addition, the characteristic matching unit 134 receives data of the span loss Lp1 calculated from the difference between the input power Pc1 of the pump light PL1 and the output power Pb1 of the pump light PL1. The characteristic matching unit 134 performs matching of the type of an optical transmission path 30a among the optical transmission paths 30a with the database of the memory 133 on the basis of the received data and outputs the correction coefficient S/P for the type of the optical transmission path 30a to the correcting unit 132.

With the aforementioned configuration, it is possible to perform the correction using the appropriate correction coefficient S/P on the basis of the type of the optical transmission path 30a and increase a measurable range of the span loss Ls1 for the wavelength band of the signal light SL1 for each of the various types of the optical transmission paths 30a as described above.

Figure 8:
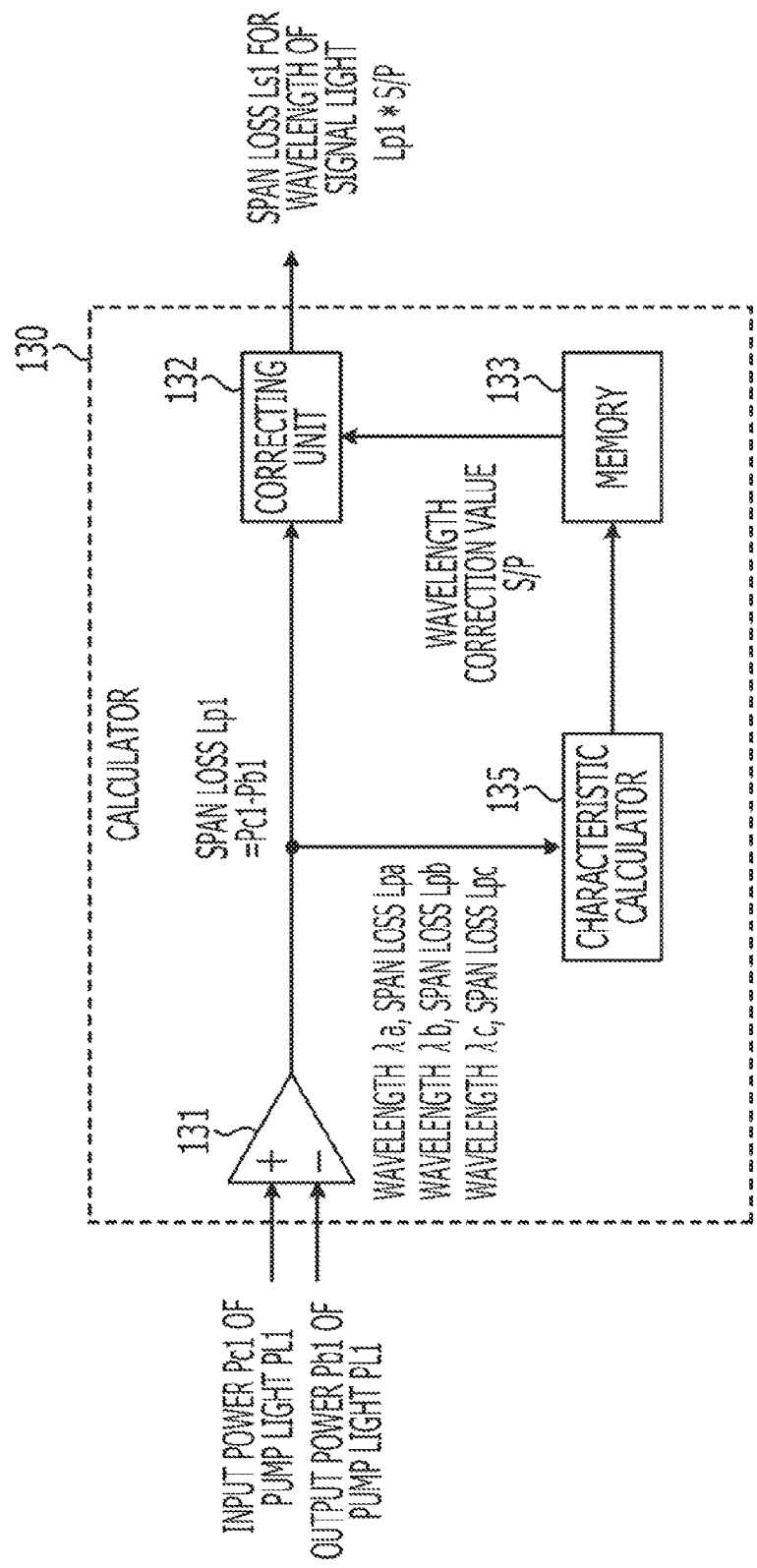
FIG. 8 is a block diagram illustrating the configuration of a function unit for performing an operation of identifying the type of an optical transmission path.
Figure 9:
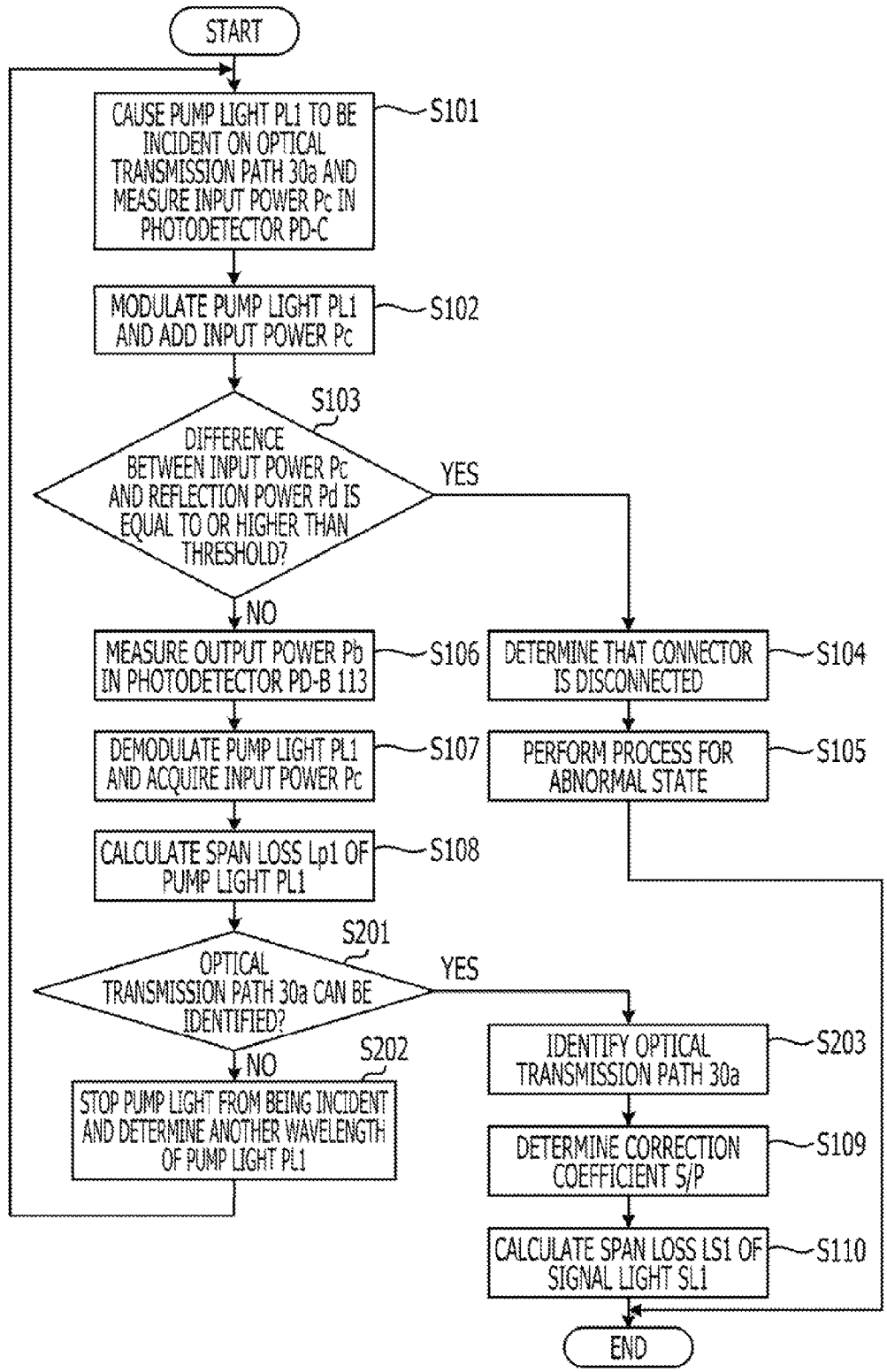
FIG. 9 is a flowchart of an operation of calculating a correction coefficient on the basis of the optical transmission path.
Figure 10:
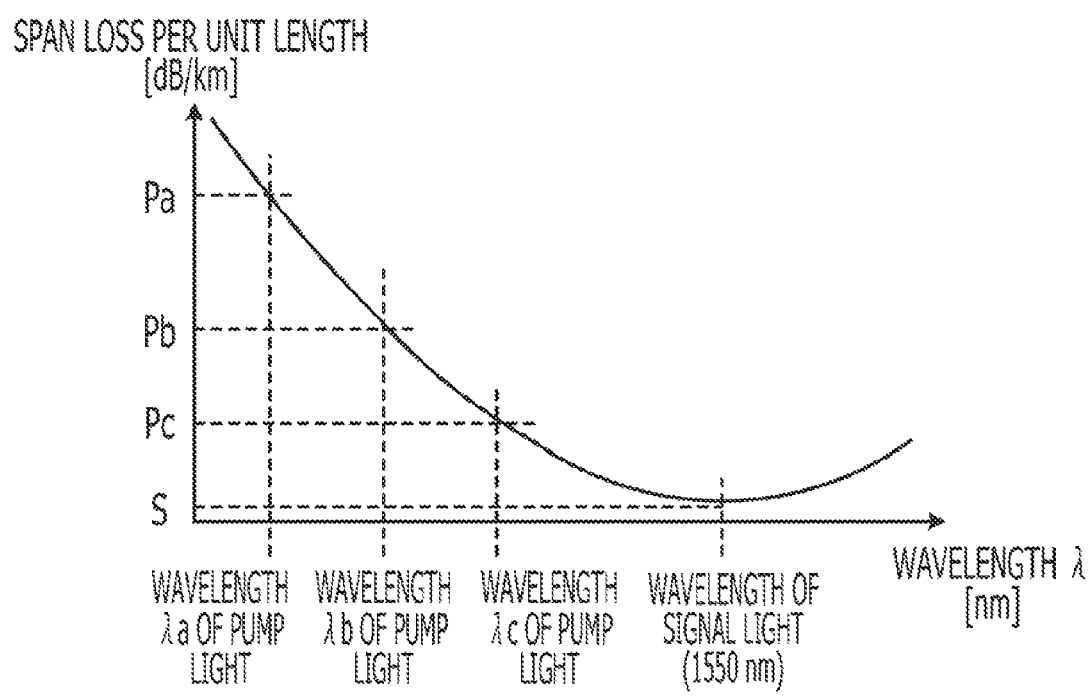
FIG. 10 is a graph illustrating the relationship between a wavelength of light propagating in the transmission path and transmission loss of the light.

An operation of identifying the type of an optical transmission path 30a used in the optical amplifier 1 and another modified example in which the identification operation is performed are described with reference to FIGS. 8 to 10. FIG. 8 is a block diagram illustrating the configuration of a function unit that is included in the calculator 130 included in the optical amplifier 1 according to the modified example and performs the operation of identifying the type of an optical transmission path 30a. FIG. 9 is a flowchart of an operation of calculating the correction coefficient on the basis of the optical transmission path, while the calculation operation is performed by the optical amplifier 1 according to the modified example. In the flowchart illustrated in FIG. 9, operations that are the same as the operations illustrated in FIG. 5 are indicated by the same symbols, and a description thereof is omitted. FIG. 10 is a graph illustrating the pump light PL1 (specifically, PL1a, PL1b and PL1c) having wavelengths, and span loss for the wavelengths of the pump light PL1 per unit length of the optical transmission path 30a.

The optical amplifier 1 according to the modified example performs the operation of identifying the type of an optical transmission path. As illustrated in FIG. 8, the function unit that is included in the calculator 130 of the Raman amplifier 1 according to the modified example has the configuration illustrated in FIG. 4 and further includes a characteristic calculator 135. The characteristic calculator 135 receives, for each of the wavelengths of the pump light PL1, data that indicates the wavelength λ of the pump light PL1 input to the calculator 130 and the span loss Lp1 calculated from the difference between the input power Pc1 and the output power Pb1. The characteristic calculator 135 identifies the type of an optical transmission path 30a by performing matching of the data received for each of the wavelengths with the database that is included in the memory 133 and stores the loss wavelength characteristics that are based on the types of the optical transmission paths 30a.

The operation of identifying an optical transmission path is described with reference to FIG. 9. The optical amplifier 1 according to the modified example repeatedly performs the operation of identifying an optical transmission path until it is determined that the optical transmission path 30a may be identified on the basis of the span loss Lp1 measured for each of the wavelengths λ. Specifically, after the operations S101 to S108 (operations from the operation S101 of causing the pump light PL1 to be incident on the optical transmission path 30a to the operation S108 of measuring the span loss Lp1 of the pump light PL1) are performed, it is determined whether or not the correction coefficient S/P may be calculated (in operation S201).

When the number of combinations of the wavelengths λ of the acquired pump light PL1 with the span loss Lp1 per unit length is small and the identification may not be performed (No in operation S201), the calculator 130 stops the outputting of the pump light PL1, then causes the pump light controller 140 to change the wavelength λ of the pump light PL1 to another wavelength in the wavelength band of the pump light PL1 and cause the pump light PL1 with the changed wavelength to be output, and measures the span loss Lp1 of the pump light PL1 with the changed wavelength (in operation S202).

As illustrated in the graph of FIG. 10, for example, the calculator 130 causes the pump light PL1 having a wavelength λa in the wavelength band of the pump light PL1 to be output. Then, the calculator 130 calculates span loss Pa (per unit length) of the pump light PL1 with the wavelength λa. Subsequently, the calculator 130 causes the pump light PL1 having a wavelength λb in the wavelength band of the pump light PL1 to be output and calculates span loss Pb (per unit length) of the pump light PL1 with the wavelength λb. Then, the calculator 130 causes the pump light PL1 having a wavelength λc in the wavelength band of the pump light PL1 to be output and calculates span loss Pc (per unit length) of the pump light PL1 with the wavelength λc. When the calculated data is accumulated and it is determined that the optical transmission path 30a may be identified (Yes in operation S201), the characteristic calculator 135 of the calculator 130 performs matching of the calculated data with the database included in the memory 133 and identifies the optical transmission path 30a (in operation S203). For example, the characteristic calculator 135 identifies the optical transmission path 30a by performing matching of the ratio of the span loss P (Pa, Pb, Pc and the like) (per unit length) of the pump light PL1 having the wavelengths λ (λa, λb, λc and the like) with the data that is stored in the database and indicates the optical transmission paths.

The correcting unit 132 receives the correction coefficient S/P of the span loss in the identified optical transmission path 30a, corrects the span loss Lp1 of the pump light PL1, and calculates the span loss Ls1 of the signal light SL1.

With the aforementioned configuration, the type of the optical transmission path 30a may be appropriately identified by measuring the span loss Lp1 using the pump light PL1. Thus, it is possible to perform the correction using the appropriate correction coefficient S/P on the basis of the type of the optical transmission path 30a and increase the measurable range of the span loss Ls1 for the wavelength band of the signal light SL1 for each of the various types of the optical transmission paths 30a as described above. Since the types of the optical fibers that are used as the optical transmission paths 30a are limited, the optical transmission paths 30a may be identified in a relatively simple manner.

The optical amplifier 1 according to the modified example may calculate the loss wavelength characteristics of the optical transmission paths by performing calculations on the basis of the obtained data, instead of performing the operation of identifying an optical transmission path 30a. As illustrated in FIG. 10 and the like, each of the loss wavelength characteristics of the optical transmission paths 30a may be approximated using a relatively low-order function such as a second-order function or a third-order function. Thus, approximated curves that are used to estimate the loss wavelength characteristics of the optical transmission paths 30a used in the optical amplifier 1 may be created by performing a relatively simple approximation on the obtained data.

Correction coefficients S/P may be calculated using the created approximated curves for the optical transmission paths 30a. The thus-configured optical amplifier 1 may estimate a loss wavelength characteristic of an optical transmission path 30a that may not be identified, and the optical amplifier 1 may calculate a correction coefficient S/P for the optical transmission path 30a. Thus, the span loss of the signal light SL1 may be appropriately measured.

The approximated curves that are used to estimate the loss wavelength characteristics of the optical transmission paths 30a are created on the basis of the actually measured span loss for the wavelength band of the pump light PL1. Thus, even when the optical transmission paths 30a include a plurality of optical transmission paths of the different types, respectively, it is effective to calculate the correction coefficients S/P on the basis of the approximated curves. Thus, even when the plurality of optical transmission paths of the different types are provided between the optical devices 10 and 20, span loss of the signal light SL1 for the wavelength band of the signal light SL1 may be calculated using the approximated curves.

Another modified example of the optical amplifier 1 is described below. In the another modified example, the optical amplifier 1 controls a gain of the Raman amplification (of the signal light SL1) to be performed by the optical devices 10 and 20 included in the optical amplifier 1.

In the optical transmission path 30a, the power of the signal light SL1 is reduced due to the aforementioned span loss. Thus, a transmission characteristic of the signal light SL1 is degraded. Therefore, the power of the signal light SL1 may be lower than a lower limit of an input dynamic range of an optical device (such as an EDFA, for example) installed on the downstream side of the optical transmission path 30a, and the signal transmission may not be appropriately performed in some cases. To avoid this, it is preferable that the amplification gain (of the signal light SL1) that is obtained by each of the optical devices 10 and 20 located on the upstream and downstream sides of the optical transmission path 30a be set on the basis of the span loss in the optical transmission path 30a so that the power of the signal light SL1 is in the input dynamic range of the downstream-side EDFA.

In order to ensure that the power of the signal light SL1 is in the input dynamic range of the downstream-side EDFA, it is considered that so-called automatic level control is performed to set the amplification gain of the signal light SL1 to a single target value so that the power of the signal light SL1 is in the input dynamic range of the downstream-side EDFA. The target value may be a predetermined target value. For the automatic level control, the amplification gain to be obtained by the optical amplifier 1 is changed on the basis of the magnitude of the span loss.

The Raman amplifier that performs the distributed Raman amplification uses an optical filter in order to equalize a gain wavelength characteristic that is a characteristic of an amplification gain that varies depending on the wavelength of the signal light SL1 to be amplified. When the amplification gain is changed, a large wavelength deviation may occur, and there may be a technical problem in which the quality of the transmission of the signal light SL1 is reduced. Especially, when the optical transmission path 30a includes a plurality of optical transmission paths and has a multi-span configuration, wavelength deviations may be accumulated. Thus, the power of the signal light SL1 with a certain wavelength may not be in the input dynamic range of the downstream-side EDFA, and the transmission characteristic is degraded. In order to solve this potential issue, it is considered that the number of the spans in the optical transmission path 30a is limited or a characteristic of the optical filter is changed on the basis of the amplification gain.

To determine target output power of the signal light SL1, information of the number of wavelengths of the signal light SL1 is received, output power per wavelength on the basis of a measured value of the total power is calculated, and the output power of the signal light SL1 on the basis of the calculated power is controlled. The operations involved to control the output power, may result in a technical problem of a response being slow.

In order to reduce and/or eliminate an effect of the wavelength deviation of the signal light SL1 in the optical amplifier 1, automatic gain control may be performed by causing the amplification gain of the signal light SL1 to be constant so that flattening of the gain wavelength characteristic is achieved. Regardless of the magnitude of the span loss, the amplification gain may be controlled and set to a constant value by the optical amplifier 1, and a wavelength deviation that is caused by a change in the amplification gain may be largely suppressed so that the wavelength deviation is small.

In the automatic gain control, as the span loss is larger, the power of the signal light SL1 that is incident on the downstream-side EDFA is reduced. Thus, the power of the signal light SL1 that is incident on the downstream-side EDFA may be lower than the lower limit of the input dynamic range of the downstream-side EDFA. The transmission efficiency may be degraded due to an insufficient effect of the amplification of the signal light SL1 when the span loss (calculated on the basis of the span loss Lp1 of the pump light PL1 as described above) of the signal light SL1 in the optical transmission path 30a is large. In addition, when the signal light has a wavelength that causes large span loss, an operation is performed while the amplification gain is larger than a predetermined amplification gain that causes the wavelength deviation to be smallest. Thus, the wavelength deviation is increased. In this state, when a process of averaging wavelength deviations is performed using a level calculation, a control error may occur in the results of the process. Thus, the wavelength deviation may be further increased.

It is preferable that the optical amplifier 1 control the power of the signal light SL1 with a wavelength that causes the span loss Ls1 of the signal light SL1 in the optical transmission path 30a to be large so that the power of the signal light SL1 that is incident on the downstream-side EDFA is constant and equal to the lower limit of the input dynamic range. In addition, it is preferable that the amplification gain be changed on the basis of the calculated value of the span loss Ls1 so that a process is not delayed owing to an operation of calculating a target amplification gain on the basis of the aforementioned acquired information of the number of wavelengths of the signal light SL1.

Figure 11:
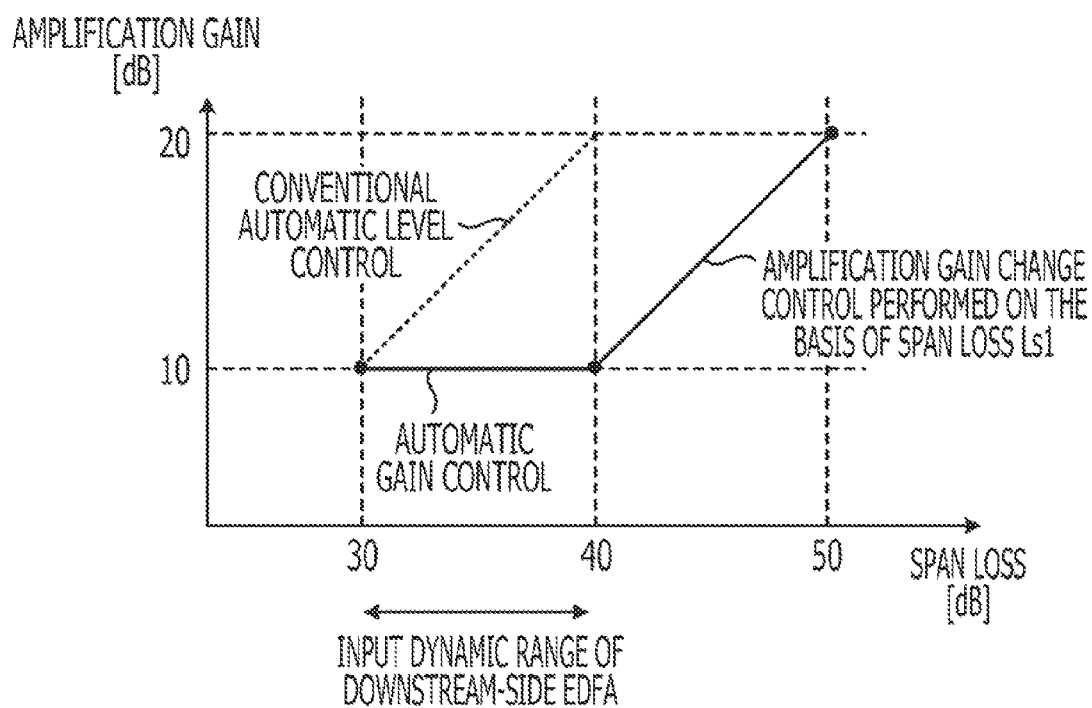
FIG. 11 is a graph illustrating a method for controlling an amplification gain of the optical amplifier on the basis of the transmission loss.

A process of setting the target amplification gain is described with reference to the graph of FIG. 11. In FIG. 11, the abscissa indicates the span loss Ls1 in the optical transmission path 30a and the ordinate indicates the amplification gain obtained by the optical amplifier 1 for the aforementioned conventional automatic level control (indicated by a dotted line), the automatic gain control (indicated by a solid line) and amplification gain change control (indicated by a solid line) that is performed on the basis of the span loss Ls1 so that target power of the signal light SL1 that is incident on the downstream-side EDFA is equal to the lower limit of the input dynamic range of the downstream-side EDFA.

In an example illustrated in FIG. 11, an upper limit of the input dynamic range of the downstream-side EDFA is set to a value (=Pa1−30+10=Pa1−20 (dB)) obtained by subtracting a span loss of 30 dB from input power Pa1 of the signal light SL1 to be incident on the optical amplifier 1 and adding an amplification gain of 10 dB to the value obtained by the subtraction. In the example illustrated in FIG. 11, the lower limit of the input dynamic range of the downstream-side EDFA is set to a value (=Pa1−40+10=Pa1−30 (dB)) obtained by subtracting a span loss of 40 dB from the input power Pa1 of the signal light SL1 to be incident on the optical amplifier 1 and adding an amplification gain of 10 dB to the value obtained by the subtraction.

In the optical amplifier 1, the amplification gain of the signal light SL1 is controlled to be 10 dB and constant when the span loss Ls1 of the signal light SL1 in the optical transmission path 30a is in a range of 30 dB to 40 dB. On the other hand, when the span loss Ls1 of the signal light SL1 in the optical transmission path 30a exceeds 40 dB, the amplification gain of the signal light SL1 is controlled so that the amplification gain increases with an increase in the calculated span loss Ls1 and has a one-to-one relationship with the calculated span loss Ls1. In order to change the amplification gain on the basis of the measured span loss Ls1, it is not necessary to acquire the information of the number of wavelengths of the signal light SL1 and calculate output power per wavelength on the basis of the total power and the information of the number of the wavelengths of the signal light SL1. Thus, a processing time may be reduced compared with the conventional automatic level control.

As described above, the conventional automatic level control and the amplification gain change control (to be performed on the basis of the span loss Ls1) are switched to each other on the basis of the magnitude of the span loss Ls1 of the signal light SL1 in the optical transmission path 30a. Thus, the amplification gain may be appropriately set for the optical transmission path 30a even when the optical transmission path 30a causes the span loss Ls1 to be relatively large. In this case, a throughput of the calculator 130 of the optical device 10 and the like may be reduced compared to the conventional automatic level control. Thus, the amplification gain may be controlled at a relatively high speed so that the target power of the signal light is equal to the lower limit of the input dynamic range. For the conventional automatic level control, it is necessary to acquire the information of the number (arbitrarily changed) of wavelengths of the signal light SL1, divide the total power by the number of the wavelengths, and calculate the average output power that is output power per wavelength. The conventional automatic level control has needed to be performed for a time period of approximately several seconds. On the other hand, in the amplification gain change control that is performed by the optical amplifier 1 according to the modified example on the basis of the measured span loss Ls1, the flattening of the wavelength characteristic of the signal light SL1 may be performed for a time period of approximately several microseconds.

The embodiment is not limited to the above description and may be modified without departing from the gist or ideas of the embodiment, while the gist or ideas of the embodiment may be understood from the claims and the entire specification. An optical amplifier modified in such a manner and a transmission loss measurement method modified in such a manner are included in the technical scope of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical amplifier that amplifies signal light with Raman amplification in the Raman amplification medium, comprising:
    a light source that supplies pump light into the Raman amplification medium;
    a first detector that detects input power of the pump light to be input to the Raman amplification medium;
    a second detector that detects output power of the pump light output from the Raman amplification medium; and
    a processor operable to:
    calculate transmission loss of the pump light in the Raman amplification medium by comparing the input power with the output power, and calculate transmission loss of the signal light in the Raman amplification medium based on the transmission loss of pump light corrected based on a wavelength of the signal light and a wavelength of the pump light,
    wherein the light source superimposes information indicating the input power on the bump light to be supplied into the Raman amplification medium by modulating a driving current to be applied to the bump light, and
    wherein the processor is operable to calculate the transmission loss of the signal light on a side on which the pump light is output from the Raman amplification medium.

2. The optical amplifier according to claim 1, further comprising:
    a third detector that detects reflection power of the pump light reflected from the Raman amplification medium,
    wherein the processor is operable to compare the input power with the refection power and to determine whether signal light is input to the Raman amplification medium based on the comparison.

3. The optical amplifier according to claim 1,
    wherein the processor is operable to:
    control an amplification gain of the signal light by controlling power of the pump light to be supplied by the light source;
    set the amplification gain to a constant value when the transmission loss of the signal light is lower than a threshold; and
    cause a target value of the amplification gain to increase based on an increase in the transmission loss of the signal light in the Raman amplification medium when the transmission loss of the signal light is equal to or higher than the threshold.

4. The optical amplifier according to claim 1,
    wherein the pump light has a plurality of different wavelengths in a wavelength band, and
    wherein the processor is operable to:
    acquire a loss wavelength characteristic that indicates a relationship between the respective wavelengths and transmission loss;
    measure transmission loss of the pump light having the plurality of different wavelengths in the Raman amplification medium; and
    estimate a loss wavelength characteristic of the Raman amplification medium based on the transmission loss of the pump light having the plurality of different wavelengths in the Raman amplification medium.

5. The optical amplifier according to claim 4,
    wherein the processor is operable to:
    refer to loss wavelength characteristic data that indicates a plurality of wavelength characteristics of Raman amplification media;
    match the measured transmission loss of the pump light having the plurality of different wavelengths in a Raman amplification medium with the referred to loss wavelength characteristic data; and
    identify the Raman amplification medium based on the matching.

6. The optical amplifier according to claim 4,
    wherein the processor is operable to:
    calculate the transmission loss of the signal light in the Raman amplification medium by correcting the transmission loss of the pump light in the Raman amplification medium based on the wavelength of the signal light, the wavelengths of the pump light and the loss wavelength characteristic of the Raman amplification medium.

7. A transmission loss measurement method that amplifies signal light with Raman amplification in the Raman amplification medium, comprising:
    supplying pump light into the Raman amplification medium;
    detecting input power of the pump light to be input to the Raman amplification medium;
    detecting output power of the pump light output from the Raman amplification medium;
    superimposing information indicating the input power on the pump light to be supplied into the Raman amplification medium by modulating a driving current to be applied to the pump light;
    calculating transmission loss of the pump light in the Raman amplification medium by comparing the input power with the output power;
    calculating transmission loss of the signal light in the Raman amplification medium by correcting the calculated transmission loss based on a wavelength of the signal light and a wavelength of the pump light; and
    calculating the transmission loss of the signal light on a side on which the pump light is output from the Raman amplification medium.

8. An optical amplifier that amplifies signal light with Raman amplification in the Raman amplification medium, comprising:
    a light source that supplies pump light into the Raman amplification medium;
    a first detector that detects input power of the pump light to be input to the Raman amplification medium;
    a second detector that detects output power of the pump light output from the Raman amplification medium; and
    a processor operable to:
    calculate transmission loss of the pump light in the Raman amplification medium by comparing the input power of the pump light with the output power of the pump light;
    calculate transmission loss of the signal light in the Raman amplification medium based on the transmission loss of pump light corrected based on a wavelength of the signal light and a wavelength of the pump light; and acquire a loss wavelength characteristic that indicates the relationship between wavelengths of light propagating in the Raman amplification medium and transmission loss of the pump light;

wherein the light source supplies, into the Raman amplification medium, the pump light that has the different wavelengths in a wavelength of the pump light, wherein the processor is operable to:

measure transmission loss of the pump light having the plurality of different wavelengths in the Raman amplification medium;

calculate a loss wavelength characteristic of the Raman amplification medium based on the transmission loss of the pump light having the plurality of different wavelengths in the Raman amplification medium;

refer to loss wavelength characteristic data that indicates a plurality of loss wavelength characteristics of Raman amplification media;

match the loss wavelength characteristic data with transmission loss of the pump light having the plurality of different wavelengths in a Raman amplification medium among the Raman amplification media and the wavelengths of the pump light; and identify the Raman amplification medium based on the matching.

9. The optical amplifier according to claim 8, wherein the processor is operable to:

calculate the transmission loss of the signal light in the Raman amplification medium by correcting the transmission loss of the pump light in the Raman amplification medium based on the wavelength of the signal light, the wavelengths of the pump light and the loss wavelength characteristic of the Raman amplification medium.

* * * * *